US011528200B2

(12) United States Patent
Pothireddy et al.

(10) Patent No.: US 11,528,200 B2
(45) Date of Patent: Dec. 13, 2022

(54) PROACTIVE INSIGHTS FOR IOT USING MACHINE LEARNING

(71) Applicant: Cisco Technology, Inc., San Jose, CA (US)

(72) Inventors: Nirup Kumar Reddy Pothireddy, San Jose, CA (US); Bipinkumar Reddy Algubelli, Sunnyvale, CA (US); Chandra Sekhar Veluru, San Jose, CA (US); Ujjval Piyushkumar Shah, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/021,330

(22) Filed: Sep. 15, 2020

(65) Prior Publication Data

US 2022/0086066 A1    Mar. 17, 2022

(51) Int. Cl.
| | |
|---|---|
| *H04L 43/028* | (2022.01) |
| *G16Y 10/75* | (2020.01) |
| *G06N 20/00* | (2019.01) |
| *H04L 67/10* | (2022.01) |
| *H04L 43/045* | (2022.01) |
| *H04L 67/12* | (2022.01) |

(52) U.S. Cl.
CPC .......... *H04L 43/028* (2013.01); *G06N 20/00* (2019.01); *G16Y 10/75* (2020.01); *H04L 43/045* (2013.01); *H04L 67/10* (2013.01); *H04L 67/12* (2013.01)

(58) Field of Classification Search
CPC ....... H04L 43/028; H04L 67/10; H04L 67/12; H04L 43/045
See application file for complete search history.

(56) References Cited

U.S. PATENT DOCUMENTS

| | | | |
|---|---|---|---|
| 2004/0017863 A1* | 1/2004 | Learned | H04L 1/0048 375/340 |
| 2005/0210227 A1* | 9/2005 | Emerson | G06F 3/1205 713/1 |
| 2007/0124109 A1* | 5/2007 | Timko | G07B 15/02 702/176 |
| 2016/0078646 A1* | 3/2016 | Liu | G06T 11/006 382/131 |
| 2017/0126709 A1 | 5/2017 | Baradaran et al. | |
| 2017/0139806 A1 | 5/2017 | Xu et al. | |
| 2017/0279837 A1 | 9/2017 | Dasgupta et al. | |
| 2019/0036795 A1 | 1/2019 | Ouyang et al. | |

(Continued)

OTHER PUBLICATIONS

Candes, et al., "Robust Principal Component Analysis?", online: https://arxiv.org/pdf/0912.3599.pdf, Dec. 2009, 39 pages.

(Continued)

*Primary Examiner* — El Hadji M Sall
(74) *Attorney, Agent, or Firm* — Behmke Innovation Group LLC; Kenneth J. Heywood; Jonathon P. Western

(57) ABSTRACT

In one embodiment, a device filters data usage metrics regarding a plurality of network nodes by one or more data characteristics, to form filtered metrics. The device applies an anomaly detector to the filtered metrics. The device distinguishes, based on an output of the anomaly detector, abnormal, unusual, and normal data usage among the filtered metrics. The device provides display data to a user interface indicative of the abnormal, unusual, and normal data usage among the filtered metrics.

18 Claims, 12 Drawing Sheets

(56) References Cited

U.S. PATENT DOCUMENTS

2019/0173753 A1* 6/2019 Correia e Costa ..... H04W 4/40
2020/0076677 A1 3/2020 Mermoud et al.
2020/0244762 A1* 7/2020 De Smet ................. H04L 67/32

OTHER PUBLICATIONS

Zhou, et al., "Stable Principal Component Pursuit", online: https://arxiv.org/pdf/1001.2363.pdf, Jan. 2010, 5 pages.
Ray, Nelson, "Algorithmic Trendspotting & the Meaning of "Interesting"", online: https://metamarkets.com/2012/algorithmic-trendspotting-the-meaning-of-interesting/, Apr. 2012, 7 pages, Metamarkets Group.
Laptev, Dmitry, "Robust PCA", online: https://github.com/dlaptev/RobustPCA, Feb. 2018, 2 pages, GitHub.
Colburn, C., "initial commit of RAD code, including R package and Java UDF", online: https://github.com/Netflix/Surus/commit/68740bea45fd0e7412cb0acfdbabe220a69420a2, Feb. 2015, 37 pages, GitHub.

* cited by examiner

View Options

View As

| Service Provider (Required) | Provider A ▶ | Account (Required) | Account Z ▶ |

Filters

| Service Type | SMS-MO ▶ | Rate Plan | Telematics Plan ▶ | Zone | Mex ▶ |
| Country | Mexico ▶ | | | Reset | Apply Filters |

FIG. 5A

Insights Details

◉ Jul 9, 2020
Highly Abnormal SMS Usage detected. Usage (1,731 Messages) is above the expected range of 1,585 to 1,622 Messages.

◉ Jul 8, 2020
Highly Abnormal SMS Usage detected. Usage (1,704 Messages) is above the expected range of 1,583 to 1,609 Messages.

◉ Jul 1, 2020
Slightly Abnormal SMS Usage detected. Usage (1,629 Messages) is above the expected range of 1,557 to 1,567 Messages.

◉ Jun 30, 2020
Highly Abnormal SMS Usage detected. Usage (1,837 Messages) is above the expected range of 1,539 to 1,663 Messages.

◉ Jun 27, 2020
Highly Abnormal SMS Usage detected. Usage (1,597 Messages) is above the expected range of 1,494 to 1,516 Messages.

PROACTIVE INSIGHTS FOR IOT USING MACHINE LEARNING

TECHNICAL FIELD

The present disclosure relates generally to computer networks, and, more particularly, to proactive insights for the Internet of Things (IoT) using machine learning.

BACKGROUND

An emerging area of interest in the field of computer networking is the "Internet of Things" (IoT), which may be used by those in the art to refer to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, window shades and blinds, doors, locks, etc.

In recent years, the management of IoT nodes has also become increasingly complex, with some enterprises now managing millions of IoT nodes at the same time. Indeed, many IoT nodes are now equipped with one, or even more, network interfaces, such as cellular, Wi-Fi, or the like. For instance, a fleet vehicle may be able to communicate via multiple cellular networks, so that the vehicle does not lose connectivity while it moves from location to location.

It has been observed that a few rogue IoT nodes consuming heavy amounts of data can become operational burdens, if not corrected in time. Unfortunately, statistical thresholds are hard to set up to identify these situations usage patterns are typically oscillating and usage patterns can vary by account, by schedule, etc.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5C illustrate examples of a user interface displaying anomaly detection information.

DESCRIPTION OF EXAMPLE EMBODIMENTS

Overview

Figure 1A:
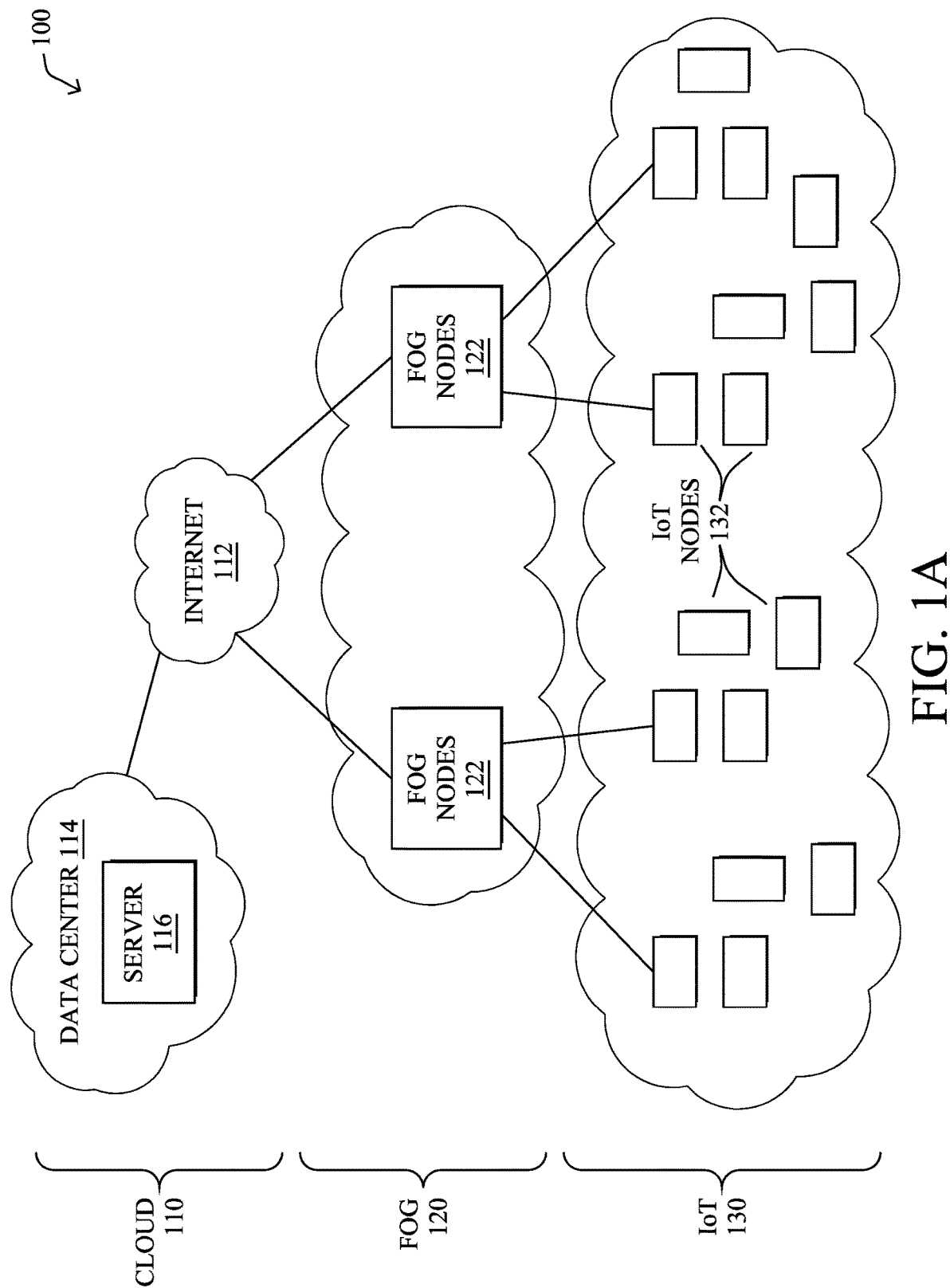
FIGS. 1A-1B illustrate an example communication network.

According to one or more embodiments of the disclosure, a device filters data usage metrics regarding a plurality of network nodes by one or more data characteristics, to form filtered metrics. The device applies an anomaly detector to the filtered metrics. The device distinguishes, based on an output of the anomaly detector, abnormal, unusual, and normal data usage among the filtered metrics. The device provides display data to a user interface indicative of the abnormal, unusual, and normal data usage among the filtered metrics.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or PLC networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services.

Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1A is a schematic block diagram of an example simplified communication network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, location, etc.

Specifically, as shown in the example network 100, three illustrative layers are shown, namely a cloud layer, a fog layer, and an IoT device/node layer. Illustratively, a cloud layer 110 may comprise general connectivity via the Internet 112, and may contain one or more datacenters 114 with one or more centralized servers 116 or other devices, as will be appreciated by those skilled in the art. Within the fog layer 120, various fog nodes/devices 122 may execute various fog computing resources on network edge devices, as opposed to datacenter/cloud-based servers or on the endpoint nodes 132 themselves of the IoT device layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Figure 1B:
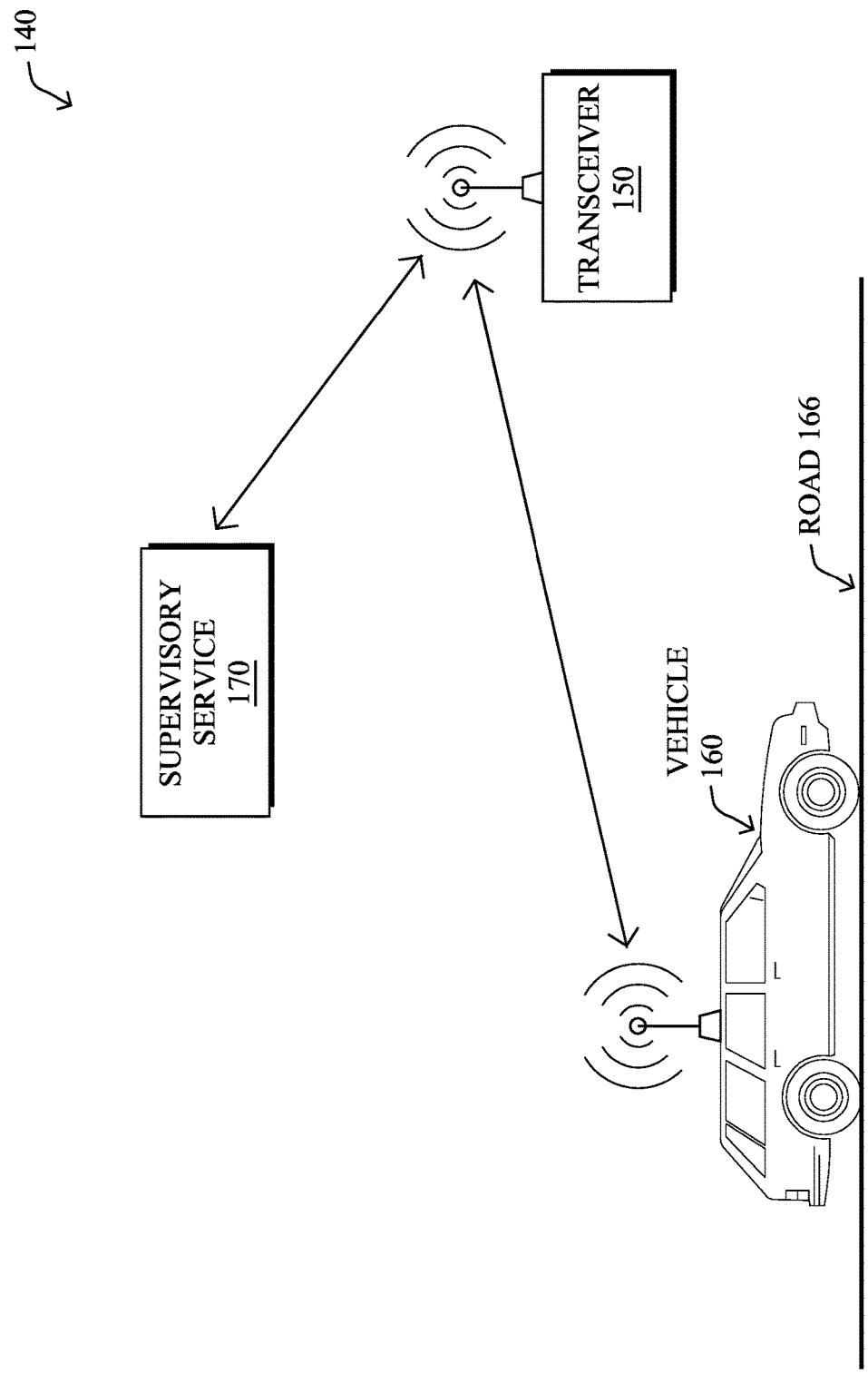

FIG. 1B illustrates an example vehicle communication system 140, according to various embodiments. In particular, vehicle communication system 140 may include any or all of the following components: a vehicle 160, a transceiver 150 (e.g., a cellular tower, a road side unit, another vehicle, etc.), and/or a remote supervisory service 170. Generally, vehicle 160 may be any form of vehicle configured to move from one physical location to another such as, but not limited to, cars, buses, trucks, boats, trains, aerial vehicles, and the like. In many cases, vehicle 160 may be configured to transport people and/or cargo. Further, vehicle 160 may be an autonomous vehicle, semi-autonomous vehicle, or manually-operated vehicle, according to the various embodiments herein.

In some embodiments, vehicle communication system 140 may be a specific implementation of communication network 100. Notably, supervisory service 170 may be implemented at the cloud layer 110, such as at a particular server 116 in a data center 114 or, alternatively, across multiple servers 116, such as part of a cloud-based service. Similarly, transceiver 150 may be a fog node 122 at fog layer 120, while vehicle 160 may be viewed as an IoT node 132 at IoT device layer 130. Thus, vehicle 160 may communicate directly with transceiver 150, and/or via other IoT nodes 132 (e.g., other vehicles, etc.), and transceiver 150 may provide some degree of processing over the communicated data.

Transceiver 150 may communicate with supervisory service 170 via a WAN, such as the Internet 112 or another WAN. For example, transceiver 150 may communicate with supervisory service 170 by leveraging a hardwired network connection, cellular or other wireless connection, satellite connection, or the like. Communications between vehicle 160 and transceiver 150 may generally be wireless and use any form of known wireless communication (e.g., Wi-Fi, cellular, light-based, etc.). In some implementations, vehicle 160 may include communication equipment that allows vehicle 160 to leverage different network connections, such as different cellular carrier networks, to ensure that vehicle 160 remains connected to supervisory service 170 as it travels.

As would be appreciated, vehicle 160 may comprise its own local network, to allow the various components of vehicle 160 to communicate with one another. For example, vehicle 160 may comprise any number of sub-networks, such as a Controller Area Network (CAN) bus, an IP network, etc., to allow the various systems of vehicle 160 to communicate with one another. Such system may include, but are not limited to, an engine control unit (ECU), a battery management system (BMS) that manages the local battery of vehicle 160, an advanced driver assistance system (ADAS) system, and the like. A local gateway of vehicle 160 may provide communicative connectivity between the local network of vehicle 160 and other devices. For example, the local gateway of vehicle 160 may provide wireless connectivity to transceiver 150 located along road 166 on which vehicle 160 is traveling. In some embodiments, vehicle 160 may also communicate directly with supervisory service 170 via the Internet 112 or another WAN, such as by leveraging a wireless connection to a cellular or satellite-based network.

Figure 2:
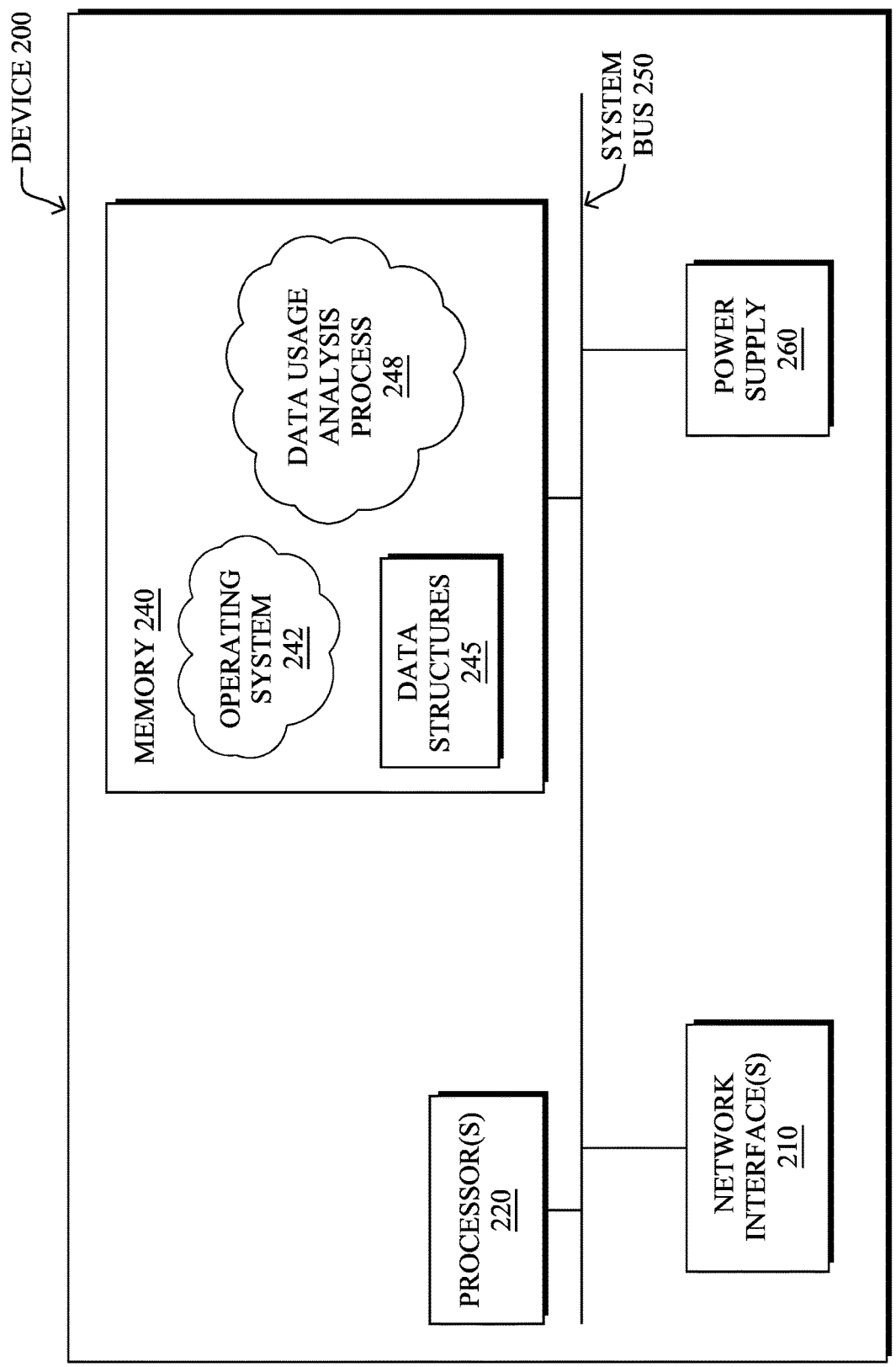
FIG. 2 illustrates an example network device/node.

FIG. 2 is a schematic block diagram of an example computing device 200 (e.g., an apparatus) that may be used with one or more embodiments described herein e.g., as any of the devices shown in FIGS. 1A-1B above (e.g., to provide supervisory service 170, etc.) or any of the devices described further below. The device may comprise one or more network interfaces 210 (e.g., wired, wireless, cellular, PLC, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100. The network interfaces may be configured to transmit and/or receive data using a variety of different communication protocols. Note, further, that the nodes may have two or more different types of network connections 210, e.g., wireless and wired/physical connections, and that the view herein is merely for illustration. Also, while the network interface 210 is shown separately from power supply 260, for fog modules using PLC, the network interface 210 may communicate through the power supply 260, or may be an integral component of the power supply. In some specific configurations the PLC signal may be coupled to the power line feeding into the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise an illustrative data usage analysis process 248, as described herein.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

In various embodiments, as detailed further below, data usage analysis process 248 may also include computer executable instructions that, when executed by processor(s) 220, cause device 200 to perform the techniques described herein. To do so, in some embodiments, data usage evaluation process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, data usage evaluation process 248 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as normal or anomalous. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that data usage evaluation process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly flagged data usage as being abnormal. Conversely, the false negatives of the model may refer to the number of times the model incorrectly flagged data usage as normal. True negatives and positives may refer to the number of times the model correctly predicted whether the data usage was normal or abnormal, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, vehicles and other nodes/device are increasing becoming connected to the Internet as part of the IoT. For instance, in the case of vehicles, Internet connectivity allows the vehicle to provide telemetry data to a supervisory service. Indeed, certain vehicle manufacturers are now collecting and monitoring telemetry data from their entire fleet of vehicles.

It has been observed that a few rogue IoT nodes consuming heavy amounts of data can become operational burdens, if not corrected in time. Unfortunately, statistical thresholds are hard to set up to identify these situations usage patterns are typically oscillating and usage patterns can vary by account, by schedule, etc. Beyond simply identifying anomalous data usage by a singular node, anomalies may also exist at a higher level of abstraction such as by rate plan, geographic zones/locations, connectivity routes, and the like. Moreover, data usage behaviors can also change over time, meaning that the definition of 'anomalous/abnormal' data consumption can also vary over time. For instance, weekday usage tends to differ from that of the weekend, daytime usage tends to be different than at nighttime, etc.

Proactive Insights for IoT Using Machine Learning

The techniques herein allow for the detection of anomalous data usage across varying degrees of abstraction ranging from rate plans, geographic locations, and connectivity routes, down to an individual vehicle or other device. In some aspects, by applying a customized machine learning model to the collected usage data, insights can be provided to a user interface, to allow the user to take corrective measures.

Specifically, according to one or more embodiments of the disclosure as described in detail below, a device filters data usage metrics regarding a plurality of network nodes by one or more data characteristics, to form filtered metrics. The device applies an anomaly detector to the filtered metrics.

The device distinguishes, based on an output of the anomaly detector, abnormal, unusual, and normal data usage among the filtered metrics. The device provides display data to a user interface indicative of the abnormal, unusual, and normal data usage among the filtered metrics.

Illustratively, the techniques described herein may be performed by hardware, software, and/or firmware, such as in accordance with the data usage analysis process 248, which may include computer executable instructions executed by the processor 220 (or independent processor of interfaces 210) to perform functions relating to the techniques described herein.

Operationally, the techniques introduced herein achieve several goals, which are particularly useful to vehicle manufacturers. First, the techniques herein are able to identify anomalies broken down by traffic type, such as data traffic, Short Message Service (SMS), in the case of cellular data usage. The techniques herein are also able to identify anomalies based on their frequencies, with vary degrees of granularity (e.g., hourly, daily, etc.). The techniques herein further allow for the data usage metrics to be filtered by various characteristics, such as zone, rate plan, country of the device, etc. In turn, the techniques herein allow users to be alerted based on different alert threshold levels that may be configured.

According to various embodiments, data usage analysis process 248 may receive data usage metrics regarding a plurality of network nodes, such as vehicles or other IoT nodes. For instance, in the case of cellular data usage, data usage analysis process 248 may receive the data usage metrics from the one or more cellular carriers, either directly or indirectly. In turn, data usage analysis process 248 may apply any number of filters to the set of data usage metrics, according to their characteristics, to form filtered metrics.

To identify any abnormal data usage, data usage analysis process 248 may apply a machine learning-based anomaly detector to the filtered metrics. Several challenges exist with respect to applying anomaly detection to data usage metrics:

1. There is likely to be a very large volume of information to process, with multiple degrees of freedom (e.g., rate plan, zone, etc.).
2. Seasonal changes in the data usage need to be identified, so that the proper model of what is considered 'normal' can be used.
3. Data distributions across different accounts are almost never consistent.
4. False positives and noise should be kept to a minimum, if possible.

In some embodiments, data usage analysis process 248 may apply a Robust Principal Component Analysis (RPCA)-based anomaly detector to the filtered metrics. In other embodiments, data usage analysis process 248 may use another machine learning-based anomaly detection approach. Generally speaking, RPCA is an adjusted statistical approach of PCA that works with corrupted observations and outliers. Example RPCA models that data usage analysis process 248 may include Surus Robust Anomaly Detection (RAD), RobustPCA, and the like.

More specifically, RPCA is a matrix decomposition algorithm that seeks to separate a matrix X into the sum of three parts as follows:

$$X=L+S+E$$

where L is a low rank matrix representing a smooth X, S is a sparse matrix containing corrupted data (e.g., the sparse outliers in the transformed space) and E is noise in the transformed space.

To convert a time series of data usage metrics, such as a filtered set of metrics, into the matrix X, data usage analysis process 248 may take into account the seasonality of the metrics. For instance, each column of matrix X may correspond to a full period of time, such as a particular day, with each row representing a different hour of the day. In another example, weekly seasonality can be assessed by representing different weeks as different columns in matrix X and their days as the rows of matrix X.

To compute the low rank matrix L, data usage analysis process 248 may perform a singular value decomposition (SVD) of matrix X and apply soft thresholds to the singular values. In addition, data usage analysis process 248 may distinguish between the entries in sparse matrix S and the noise entries in matrix E using a threshold. This leads to two scalars that can be employed:

L_penality/L_Transform—this scalar controls the amount of thresholding used to determine matrix L from matrix X.

S_penality/S_Transform—this scalar control the amount of thresholding to determine the separation between matrices S and E.

Figure 3A:
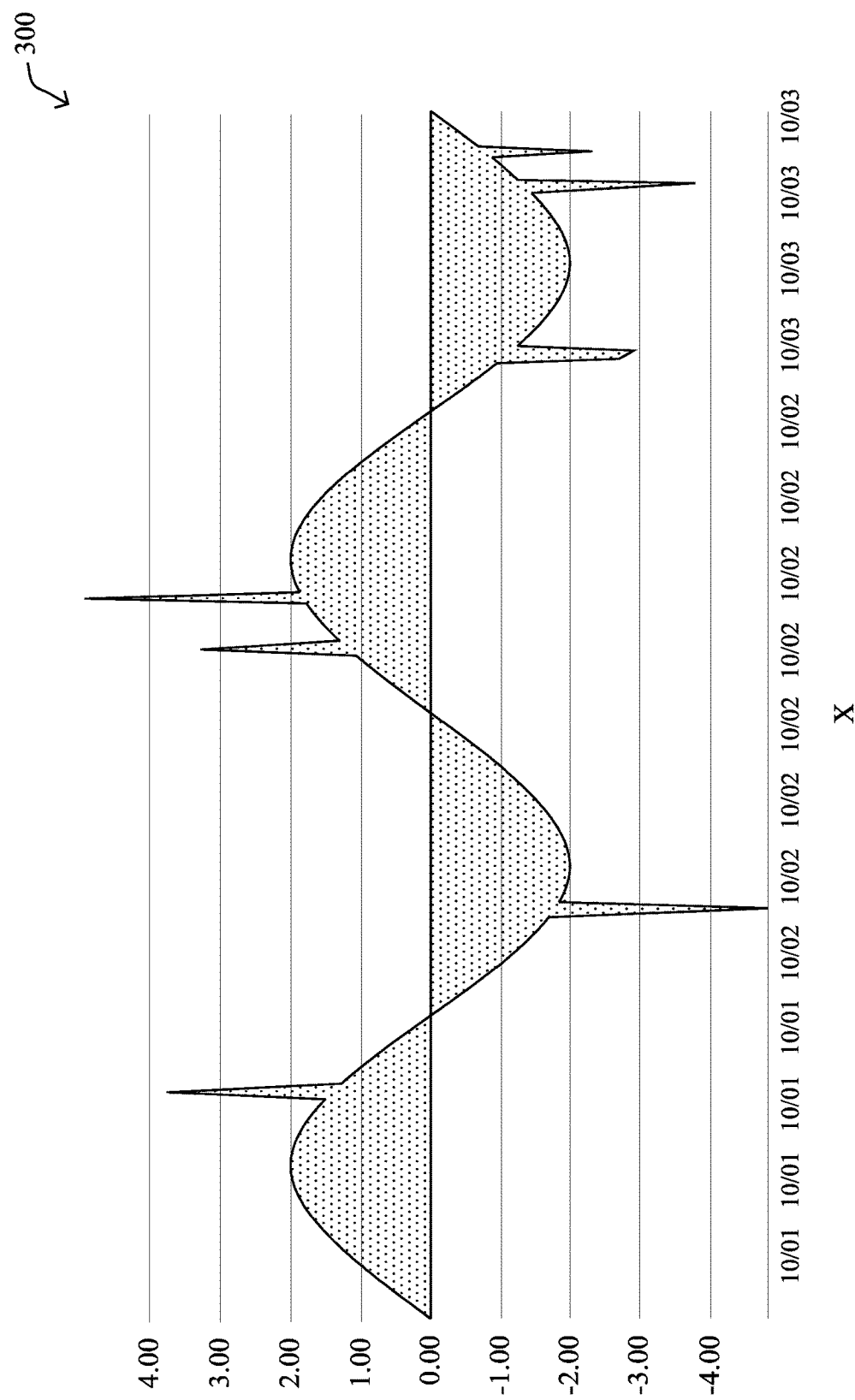
FIGS. 3A-3D illustrate example plots demonstrating robust principal component analysis (RPCA) of a time series.
Figure 3B:
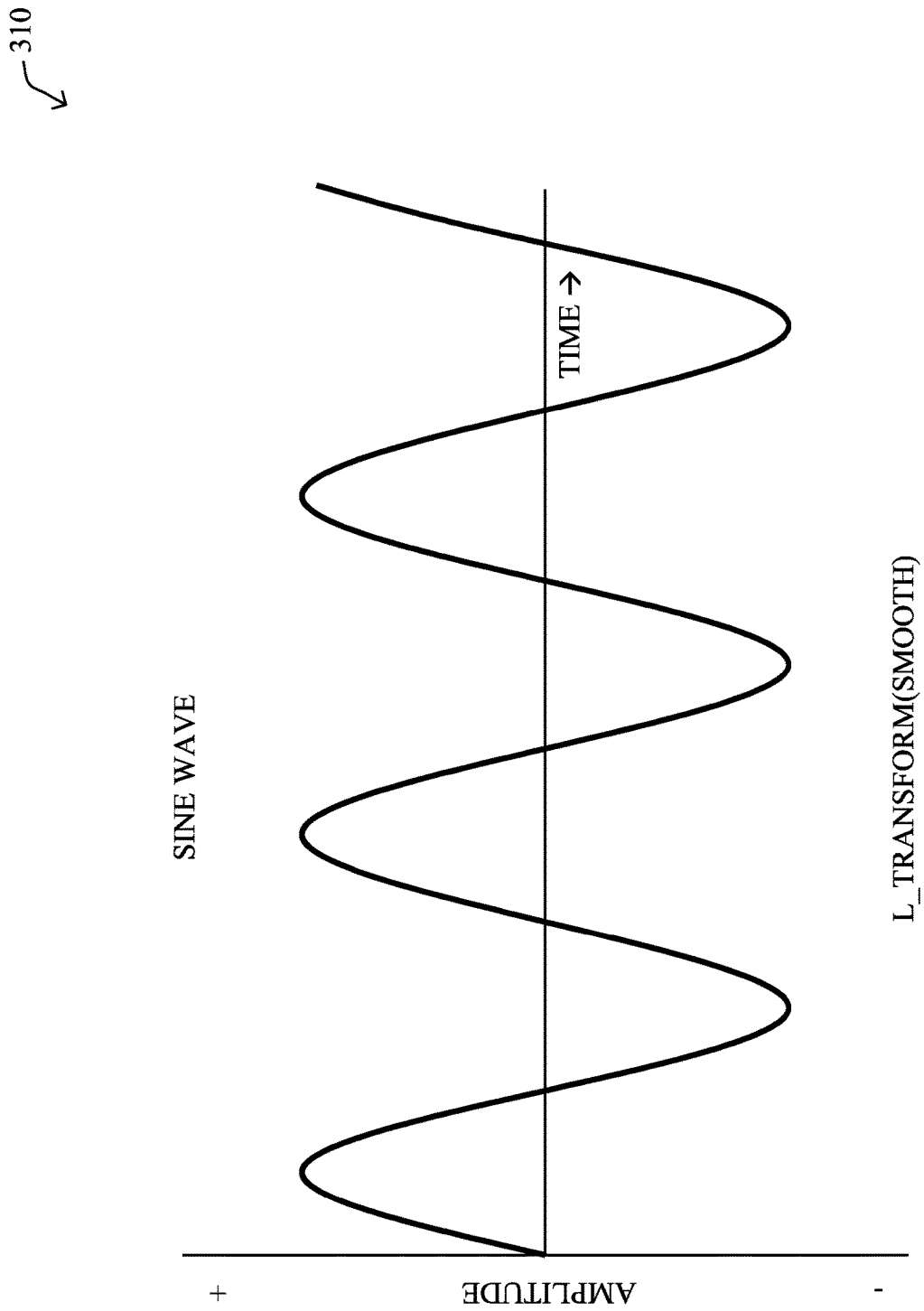
Figure 3C:
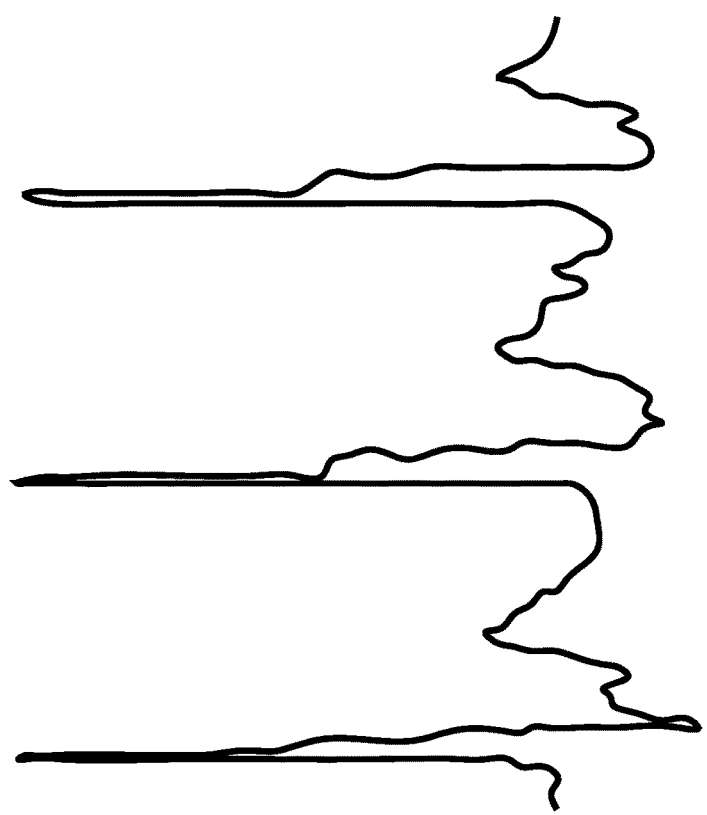
Figure 3D:
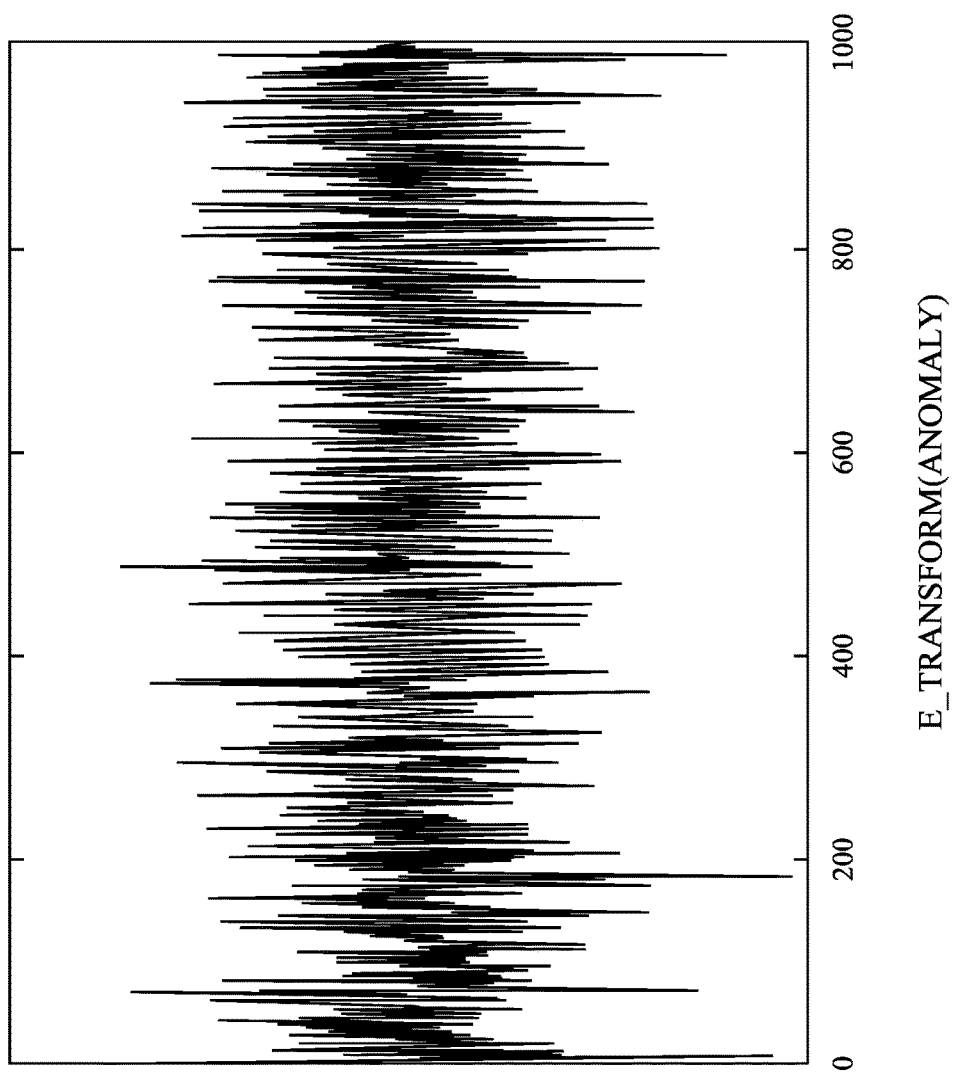

FIGS. 3A-3D illustrate example plots demonstrating robust principal component analysis (RPCA) of a time series. FIG. 3A illustrates an example plot 300 of X, which may comprise the data usage metrics from a plurality of IoT nodes. FIG. 3B illustrates an example plot 310 of L_Transform(smooth), which is a low rank, smoothed form of X. FIG. 3C illustrates an example plot 320 of S_Transform (Anomaly), which is the anomalous series from X. Finally, FIG. 3D illustrates an example plot 330 of E_Transform (Anomaly), which is the error.

Another thing that the anomaly detector of data usage analysis process 248 may perform is apply an Augmented Dickey Fuller Test to determine whether matrix X is stationary. If not, the anomaly detector may difference the time series of usage metrics before applying RPCP.

By way of example, consider a time series (filtered) usage metrics for N-number of days. In such a case, data usage analysis process 248 may create a two-dimensional (2D) matrix from this data. This can be achieved by considering all of the latest points in the time series and neglecting the beginning points from the time series, such that:

$$X=m*N$$

where m denotes the points per day and N is the number of days. In essence, the intent is to only consider the data that is required from the current day under scrutiny to prior days such that the number of points is an exact multiple of frequency.

In order to apply RPCA, the data needs to be reformatted as a 2D matrix. Say there is ten days' worth of data and twenty-four points per day. This means a set of 240 data points. If the required frequency is 24, then the matrix may be formed as 24*10, where each column is a day and there are ten such columns in the matrix. RPCA can then be applied to the matrix.

As would be appreciated, the above approach addresses seasonality by aligning historic usage metrics in a symmetric fashion. For instance, usage metrics captured on Mondays may be aligned in a single row, usage metrics captured on Tuesdays may be aligned in another row, etc. Doing so establishes seasonality across all of the time series data points. In turn, data usage analysis process 248 may look at the data within a given seasonal time span (e.g., Mondays, etc.) to find abnormalities.

Figure 4:
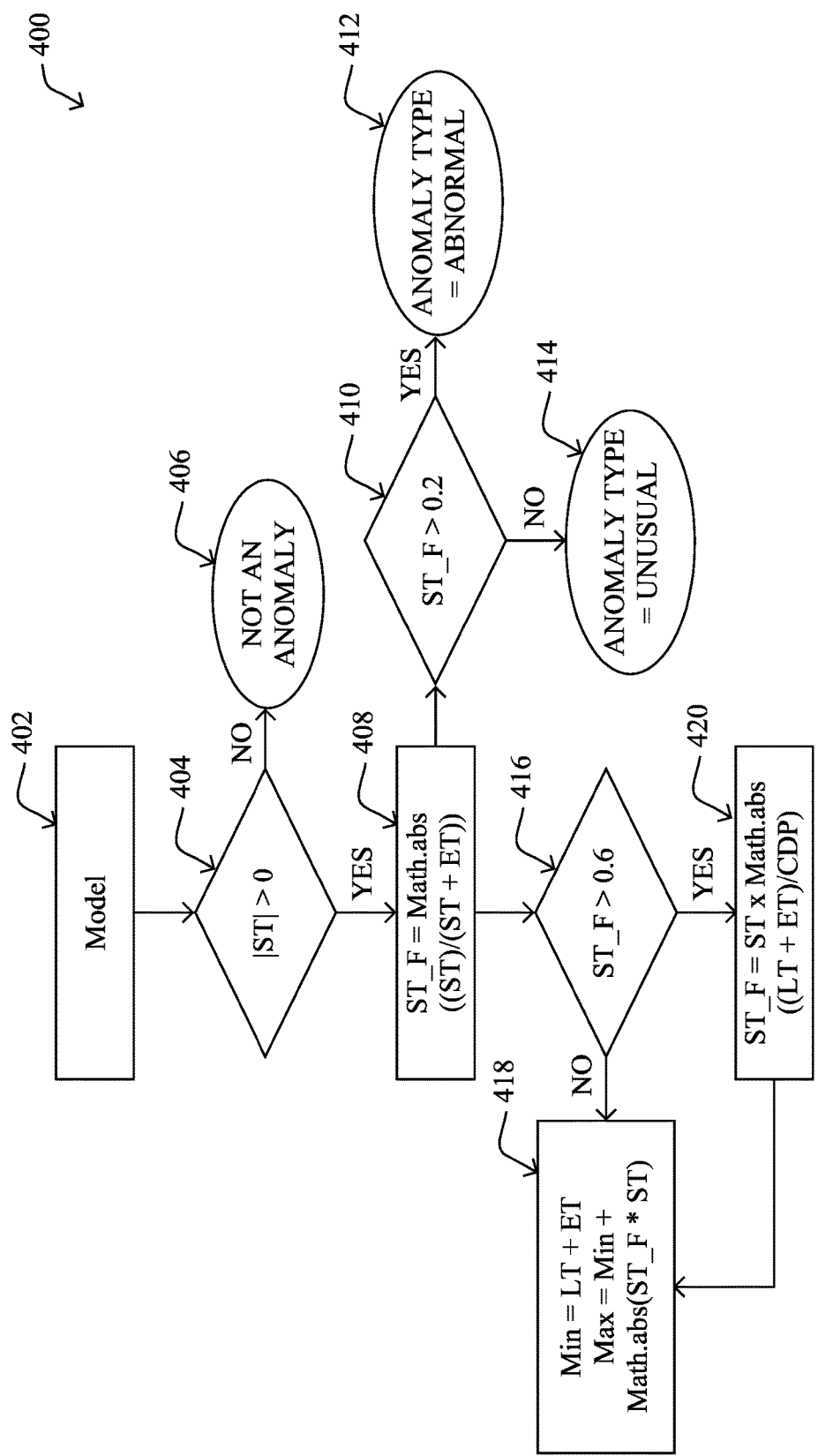
FIG. 4 illustrates an example diagram for generating proactive insights.

Referring now to FIG. 4, an example diagram 400 for generating proactive insights is shown, according to various embodiments. As noted above, data usage analysis process 248 may apply an anomaly detection model on data usage metrics, such as an RPCA-based anomaly detector. While traditional RPCA-based anomaly may make a binary decision between whether data usage is normal or abnormal, the techniques herein further propose using an intermediate category: unusual data usage. Indeed, it may be the case that the data usage of a particular vehicle or set of vehicles is trending upward. Rather than wait until the usage exceeds an acceptable threshold, having an intermediate category allows for the early detection of such conditions.

As shown, application of an RPCA-based anomaly model 402 may result in a number of output parameters that result from the decomposition of the X matrix. The following terminology is used, to further illustrate the techniques herein:

ST—the S_Transform output by model 402
LT—the L_Transform output by model 402
ET—the E_Transform output by model 402
ST_F—S_Transform fraction
CDP—Current Data Point
Min—Minimum range
Max—Maximum range Based on the output parameters of model 402, data usage analysis process 248 may make a decision 404 as to whether the absolute value of ST from model 402 is non-zero. If so, data usage analysis process 248 may make a determination 406 that the data usage is not anomalous. Otherwise, data usage analysis process 248 may proceed to make a computation 408, to compute ST_F using ST and ET output by model 402.

In some embodiments, data usage analysis process 248 may make computation 408 by first dividing ST by the sum of ST and ET. Then, data usage analysis process 248 may compute ST_F as the absolute value of that result. In effect, this computes deviation from the norm. Ideally, CDP=L+E. However, when there is a slight deviation from the norm, data usage analysis process 248 uses this to measure the amount of deviation from the norm, given ST.

In turn, data usage analysis process 248 may use the computed ST_F to make a decision 410. If ST_F>0.2, data usage analysis process 248 may make a determination 412 that the data usage is anomalous and of anomaly type 'abnormal.' Conversely, if ST_F is not greater than 0.2, data usage analysis process 248 may make a determination 414 that the data usage is instead of anomaly type 'unusual.'

In addition to determining whether the data usage is abnormal or unusual, data usage analysis process 248 may also make a determination 416 as to whether ST_F is greater than 0.6. If so, data usage analysis process 248 may perform computation 420 to recompute ST_F as ST times the absolute value of (LT+ET)/CDP. In effect, this penalizes ST_F, so that data usage analysis process 248 can find the actual range for which CDP belongs. Indeed, if ST is large enough to meet the condition of determination 416, ST/(ST+ET) will be close to ST, so doing so penalizes ST by a factor of the deviance.

If data usage analysis process 248 determines instead that STFF is not greater than 0.6 (e.g., is less than or equal to 0.6), it may instead perform computation 418 in which data usage analysis process 248 sets Min=LT+ET and Max=the current Max plus the absolute value of the product of ST_F and ST.

Figure 5B:
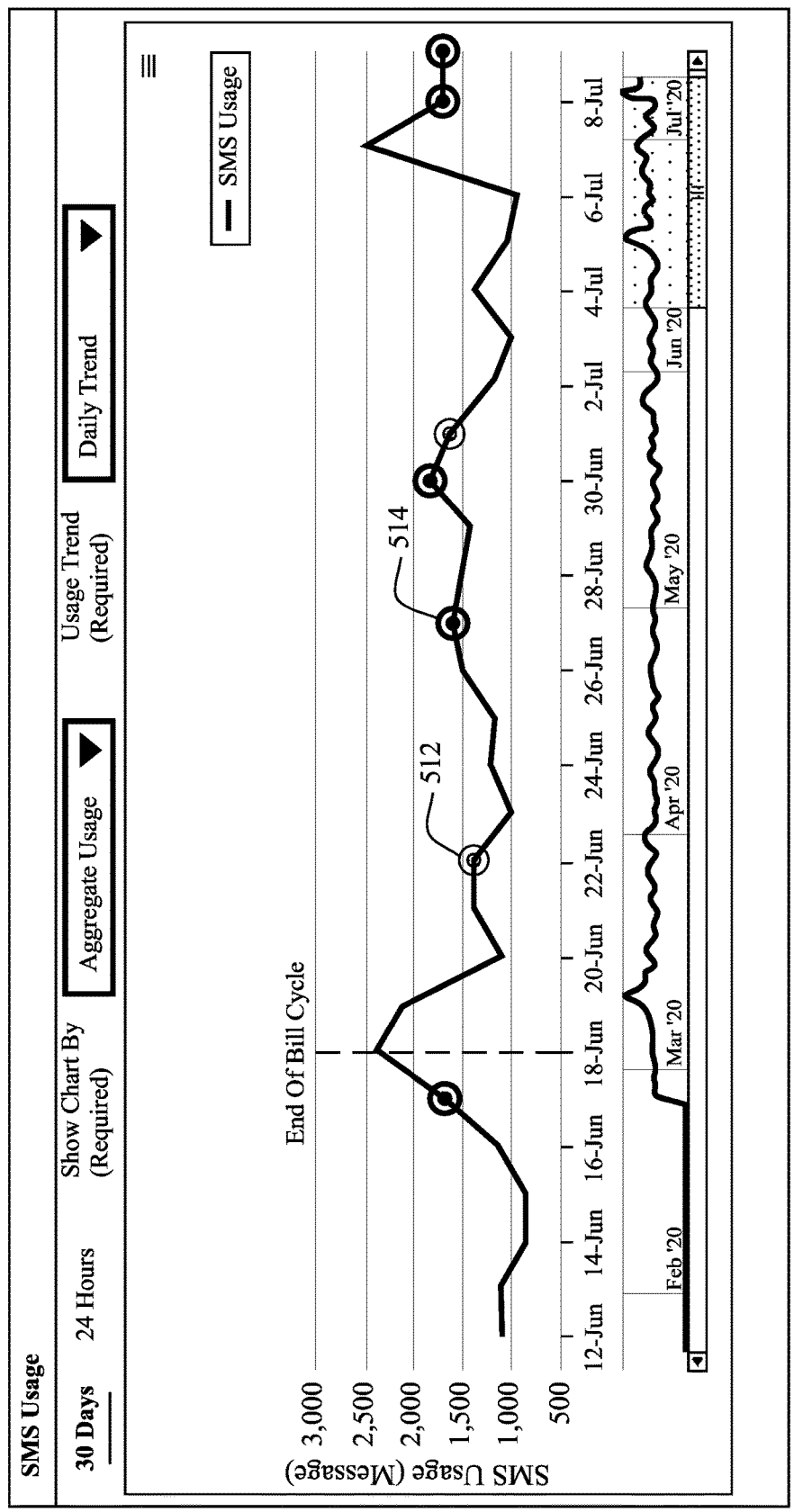

FIGS. 5A-5C illustrate examples of a user interface displaying anomaly detection information, according to various embodiments. More specifically, a prototype system was constructed using the techniques herein and used to output display data, such as the display data shown in FIGS. 5A-5C. For instance, a device executing data usage analysis process 248 (e.g., a device 200) may provide display data to a user interface that causes the user interface to display any or all of the information shown in FIGS. 5A-5C.

FIG. 5A illustrates an example display dialog 500. As shown, the user of the system may have the option to view data usage metrics broken down by service provider and/or account, and filtered by any or all of the following characteristics: service type, rate plane, zone, or country. For instance, a user may opt to view the data usage metrics for service provider A under account Z having service type SMS-MO, a telematics rate plan, in zone 'MEX,' and for nodes located in Mexico.

FIG. 5B illustrates an example output display 510 showing the resulting display data when options are selected via dialog 500. Here, output display 510 may comprise a temporal plot of the filtered usage metrics over a selected time period (e.g., 30 days, 24 hours, etc.), such as a plot of SMS usage over the course of time. Optionally, output display 510 may also include options to adjust the displayed plot, such as by aggregating the usage across different nodes, for an individual node, etc. In addition, the usage trends may be adjusted via output display 510 to show trends, such as daily trends, weekly trends, monthly trends, etc. Billing information may also be displayed in the plot, such as to denote the end or start of a billing cycle.

In some embodiments, output display 510 may also include indicia indicative of any unusual or abnormal data usage, as detected by the system. For instance, the plotted data usage on June $22^{nd}$ may include indicia 512 indicating that the usage was unusual for that day. Similarly, the plotted data usage on June $27^{th}$ may include indicia 514 indicating that the usage was abnormal for that day.

FIG. 5C illustrates another example output display 520 that may be presented by the user interface in conjunction with that of output display 510 or separately therefrom. As shown, output display 520 may include insight information regarding any unusual or abnormal data usage detected by the system. Such insight information may include, for instance, the type of traffic associated with the data usage (e.g., SMS, data, voice, etc.), the expected range for the usage, and the observed usage. As noted previously, the expected/normal range for the usage may differ by seasonal time periods, such as day of the week, time of day, etc. For instance, June $27^{th}$ may have an expected usage between 1,494 and 1,516 SMS messages, while July $9^{th}$ may have an expected usage between 1,585 and 1,622 SMS messages. The usual and abnormal designations may, therefore, be based on how much deviation there is between these ranges and the observed usage.

Figure 6:
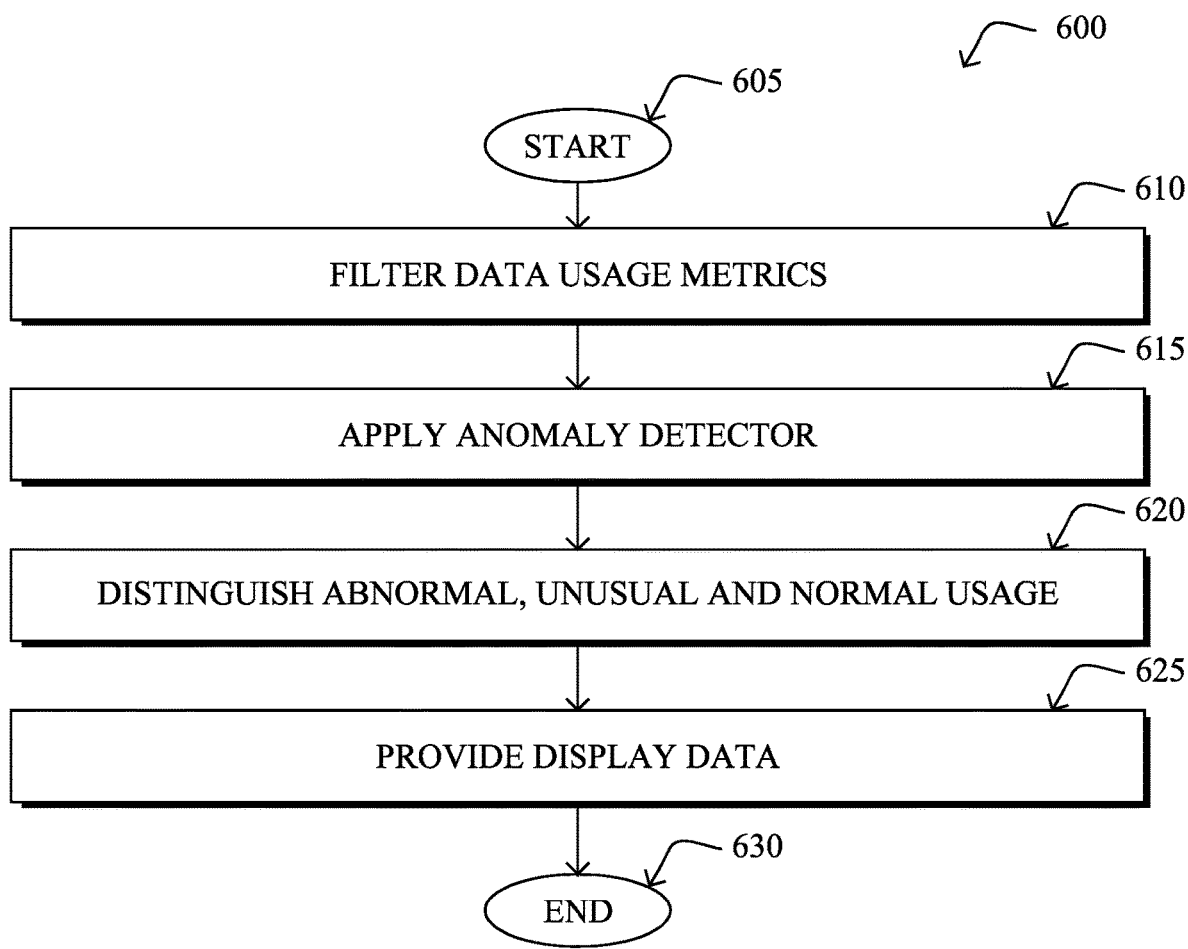
FIG. 6 illustrates an example simplified procedure for evaluating data usage by network nodes.

FIG. 6 illustrates an example simplified procedure 600 for evaluating data usage by network nodes, in accordance with one or more embodiments described herein. For example, a non-generic, specifically configured device (e.g., device 200) of an electric vehicle may perform procedure 600 by executing stored instructions (e.g., process 248). The procedure 600 may start at step 605, and continues to step 610, where, as described in greater detail above, the device may filter data usage metrics regarding a plurality of network nodes by one or more data characteristics, to form filtered metrics. For instance, the network nodes may comprise vehicles or other IoT nodes that are configured to communicate via one or more networks. In some cases, the data usage metrics may also be aggregated for any particular node across different carrier networks, as in the case of a node being able to communicate via different cellular carriers. In various embodiments, the characteristics by which the device filters the data usage metrics may include, but are not limited to, any or all of the following: a rate plan, a location, data traffic, voice traffic, SMS traffic, or the like.

At step 615, as detailed above, the device may apply an anomaly detector to the filtered metrics. In some embodiments, the device may do so by first dividing the filtered metrics, to account for seasonal patterns. For instance, the device may form a matrix of metric values by symmetrically aligning the filtered metrics from like time periods (e.g., hours of the day, days of the week, etc.). In further embodiments, the anomaly detector may be an RPCA-based anomaly detector.

At step 620, the device may distinguish, based on an output of the anomaly detector, abnormal, unusual, and normal data usage among the filtered metrics, as described in greater detail above. In some embodiments, such as when the anomaly detector is an RPCA-based detector, the device may do so by determining a fraction of sparse outliers among the filtered metrics identified by the anomaly detector and comparing the fraction of sparse outliers to a predefined threshold. Doing so may allow the device to distinguish between abnormal data usage and unusual data usage among the filtered metrics. In further embodiments, if the S_transform from the anomaly detector is zero, then the device may determine that the data usage is normal and not an anomaly.

At step 625, as detailed above, the device may provide display data to a user interface indicative of the abnormal, unusual, and normal data usage among the filtered metrics. In some embodiments, the display data may cause the user interface to display a trend plot of the filtered metrics (e.g., the usage metrics over time). In further embodiments, the device may also update the display data based on requests received via the user interface. For instance, the device may receive a data filter request from the user interface, form second filtered metrics from the data usage metrics, distinguish abnormal, unusual, and normal data usage among the second filtered metrics, and provide second display data to the user interface indicative of the abnormal, unusual, and normal data usage among the second filtered metrics. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for proactive insights for IoT using machine learning, it is to be understood that various other adaptations and modifications may be made within the intent and scope of the embodiments herein. For example, while specific protocols are used herein for illustrative purposes, other protocols and protocol connectors could be used with the techniques herein, as desired. In addition, while certain anomaly detection models and parameters (e.g., thresholds) are shown, these models may be used on other forms of data and the parameters may be adjusted, as desired. Further, while the techniques herein are described as being performed by certain locations within a network, the techniques herein could also be performed at other locations, such as at one or more locations fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   filtering, by a device, data usage metrics regarding a plurality of network nodes by one or more data characteristics, to form filtered metrics, the data usage metrics indicative of an amount of data used by the plurality of network nodes;
   applying, by the device, an anomaly detector to the filtered metrics;
   distinguishing, by the device and based on an output of the anomaly detector, abnormal, unusual, and normal data usage among the filtered metrics; and
   providing, by the device, display data to a user interface indicative of the abnormal, unusual, and normal data usage among the filtered metrics,
   wherein distinguishing, by the device and based on the output of the anomaly detector, abnormal, unusual, and normal data usage among the filtered metrics comprises:
      determining a fraction of sparse outliers among the filtered metrics identified by the anomaly detector; and
      comparing the fraction of sparse outliers to a predefined threshold, to distinguish between abnormal data usage and unusual data usage among the filtered metrics.

2. The method as in claim 1, wherein the one or more data characteristics of the data usage metrics comprise at least one of: data traffic, voice traffic, or Short Message Service (SMS) traffic.

3. The method as in claim 1, wherein the one or more data characteristics of the data usage metrics comprise at least one of: rate plan or location.

4. The method as in claim 1, wherein applying the anomaly detector to the filtered metrics comprises:
   forming a matrix of metric values by symmetrically aligning the filtered metrics from like time periods.

5. The method as in claim 1, wherein the anomaly detector comprises a robust principal component analysis (RPCA)-based anomaly detector.

6. The method as in claim 1, further comprising:
   receiving, at the device, a data filter request from the user interface;
   forming, based on the data filter request, second filtered metrics from the data usage metrics;
   distinguishing abnormal, unusual, and normal data usage among the second filtered metrics; and
   providing second display data to the user interface indicative of the abnormal, unusual, and normal data usage among the second filtered metrics.

7. The method as in claim 1, wherein the display data causes the user interface to display a trend plot of the filtered metrics.

8. The method as in claim 1, wherein the plurality of network nodes comprises vehicles.

9. An apparatus, comprising:
one or more network interfaces;
a processor coupled to the one or more network interfaces and configured to execute one or more processes; and
a memory configured to store a process that is executable by the processor, the process when executed configured to:
filter a set of data usage metrics regarding a plurality of network nodes by one or more data characteristics, to form filtered metrics, the data usage metrics indicative of an amount of data used by the plurality of network nodes;
apply an anomaly detector to the filtered metrics;
distinguish, based on an output of the anomaly detector, abnormal, unusual, and normal data usage among the filtered metrics; and
provide display data to a user interface indicative of the abnormal, unusual, and normal data usage among the filtered metrics,
wherein the apparatus distinguishes, based on the output of the anomaly detector, abnormal, unusual, and normal data usage among the filtered metrics by:
determining a fraction of sparse outliers among the filtered metrics identified by the anomaly detector; and
comparing the fraction of sparse outliers to a predefined threshold, to distinguish between abnormal data usage and unusual data usage among the filtered metrics.

10. The apparatus as in claim 9, wherein the one or more data characteristics comprise at least one of: data traffic, voice traffic, or Short Message Service (SMS) traffic.

11. The apparatus as in claim 9, wherein the one or more data characteristics comprise at least one of: rate plan or location.

12. The apparatus as in claim 9, wherein the apparatus applies the anomaly detector to the filtered metrics by:
forming a matrix of metric values by symmetrically aligning the filtered metrics from like time periods.

13. The apparatus as in claim 9, wherein the anomaly detector comprises a robust principal component analysis (RPCA)-based anomaly detector.

14. The apparatus as in claim 9, wherein the process when executed is further configured to:
receive a data filter request from the user interface;
form, based on the data filter request, second filtered metrics from the set of data usage metrics;
distinguish abnormal, unusual, and normal data usage among the second filtered metrics; and
provide second display data to the user interface indicative of the abnormal, unusual, and normal data usage among the second filtered metrics.

15. The apparatus as in claim 9, wherein the display data causes the user interface to display a trend plot of the filtered metrics.

16. The apparatus as in claim 9, wherein the plurality of network nodes comprises vehicles.

17. A computer-readable medium that is tangible, non-transitory, and stores program instructions that cause a device to execute a process comprising:
filtering, by the device, data usage metrics regarding a plurality of network nodes by one or more characteristics of the data usage metrics, to form filtered metrics, the data usage metrics indicative of an amount of data used by the plurality of network nodes;
applying, by the device, an anomaly detector to the filtered metrics;
distinguishing, by the device and based on an output of the anomaly detector, abnormal, unusual, and normal data usage among the filtered metrics; and
providing, by the device, display data to a user interface indicative of the abnormal, unusual, and normal data usage among the filtered metrics,
wherein distinguishing, by the device and based on the output of the anomaly detector, abnormal, unusual, and normal data usage among the filtered metrics comprises:
determining a fraction of sparse outliers among the filtered metrics identified by the anomaly detector; and
comparing the fraction of sparse outliers to a predefined threshold, to distinguish between abnormal data usage and unusual data usage among the filtered metrics.

18. The computer-readable medium as in claim 17, wherein the plurality of network nodes comprises vehicles.

* * * * *

UNITED STATES PATENT AND TRADEMARK OFFICE
CERTIFICATE OF CORRECTION

| | |
|---|---|
| PATENT NO. | : 11,528,200 B2 |
| APPLICATION NO. | : 17/021330 |
| DATED | : December 13, 2022 |
| INVENTOR(S) | : Nirup Kumar Reddy Pothireddy et al. |

Page 1 of 1

It is certified that error appears in the above-identified patent and that said Letters Patent is hereby corrected as shown below:

In the Specification

Column 7, Line 66, please amend as shown:
outliers in the transformed space), and E is noise in the Column 8, Line 38, please amend as shown:
By way of example, consider a time series of (filtered) usage Column 9, Line 38, please amend as shown:
this computes the deviation from the norm. Ideally, CDP = L+E.

Column 9, Line 61, please amend as shown:
ST_F is not greater than 0.6 (e.g., is less than or equal to Signed and Sealed this
Twenty-eighth Day of February, 2023

Katherine Kelly Vidal
*Director of the United States Patent and Trademark Office*